US007657511B2

(12) United States Patent
Brookler et al.

(10) Patent No.: US 7,657,511 B2
(45) Date of Patent: Feb. 2, 2010

(54) MULTI-LAYERED DATA MODEL FOR GENERATING AUDIENCE-SPECIFIC DOCUMENTS

(75) Inventors: David E. Brookler, Los Angeles, CA (US); Dave L. Sullivan, Canoga Park, CA (US); Paul N. Weinberg, Los Angeles, CA (US); Richard T. Endo, Los Angeles, CA (US); Philip A. Tinari, Los Angeles, CA (US); Nathan F. Yospe, Glendale, CA (US)

(73) Assignee: SAP, AG, Walldorf (DE)

( * ) Notice: Subject to any disclaimer, the term of this patent is extended or adjusted under 35 U.S.C. 154(b) by 332 days.

(21) Appl. No.: 11/142,809

(22) Filed: May 31, 2005

(65) Prior Publication Data

US 2006/0271571 A1 Nov. 30, 2006

(51) Int. Cl.
*G06F 7/00* (2006.01)
(52) U.S. Cl. ............................. 707/3; 707/102; 715/265
(58) Field of Classification Search ................ 707/1, 707/100
See application file for complete search history.

(56) References Cited

U.S. PATENT DOCUMENTS

| 5,228,121 | A | * | 7/1993 | Fontaine et al. ............. 715/531 |
| 5,375,164 | A | * | 12/1994 | Jennings ................... 379/88.05 |
| 5,416,903 | A | * | 5/1995 | Malcolm .................... 715/703 |
| 5,442,782 | A | * | 8/1995 | Malatesta et al. .............. 707/4 |
| 5,655,130 | A | * | 8/1997 | Dodge et al. ................ 715/511 |
| 5,737,726 | A |   | 4/1998 | Cameron |
| 5,761,673 | A | * | 6/1998 | Bookman et al. ........... 719/311 |
| 5,805,118 | A |   | 9/1998 | Mishra et al. |
| 5,835,912 | A | * | 11/1998 | Pet ........................... 707/104.1 |
| 5,944,790 | A | * | 8/1999 | Levy .......................... 709/218 |
| 5,956,737 | A |   | 9/1999 | King et al. |
| 6,018,742 | A | * | 1/2000 | Herbert, III ................. 707/102 |
| 6,429,879 | B1 |   | 8/2002 | Sturgeon et al. |
| 6,516,312 | B1 | * | 2/2003 | Kraft et al. ..................... 707/3 |
| 6,526,426 | B1 | * | 2/2003 | Lakritz ....................... 715/536 |
| 6,532,442 | B1 |   | 3/2003 | Schumacher et al. |
| 6,623,529 | B1 | * | 9/2003 | Lakritz ....................... 715/536 |
| 6,865,716 | B1 | * | 3/2005 | Thurston .................... 715/207 |
| 2002/0069049 | A1 | * | 6/2002 | Turner ........................... 704/8 |
| 2002/0111933 | A1 | * | 8/2002 | Noble et al. ................... 707/1 |
| 2002/0143523 | A1 | * | 10/2002 | Balaji et al. .................... 704/8 |
| 2002/0193983 | A1 | * | 12/2002 | Tokieda et al. ................ 704/2 |
| 2003/0126559 | A1 | * | 7/2003 | Fuhrmann .................... 715/513 |
| 2003/0187827 | A1 | * | 10/2003 | Sumitomo .................... 707/1 |
| 2004/0103075 | A1 | * | 5/2004 | Kim et al. ...................... 707/1 |
| 2004/0167784 | A1 | * | 8/2004 | Travieso et al. .......... 704/270.1 |
| 2004/0220893 | A1 |   | 11/2004 | Spivack |
| 2005/0007336 | A1 |   | 1/2005 | Albert |
| 2006/0080285 | A1 |   | 4/2006 | Chowdhuri |

* cited by examiner

*Primary Examiner*—Pierre M Vital
*Assistant Examiner*—Augustine Obisesan
(74) *Attorney, Agent, or Firm*—Dalina Law Group, P.C.

(57) ABSTRACT

One or more embodiments of invention are directed to a multi-layered data model for generating audience-specific documents will now be described. The invention is used in the context of generating a document such as a catalog or web page for publication across regions and cultures comprising multiple languages. It allows users to rapidly generate multi-language, multi-culture and multi-region documents since fields flagged as multi-lingual may utilize existing buckets that comprise pre-filled multi-language, multi-culture and multi-region values without requiring the user to specify every multi-value when creating a record.

20 Claims, 7 Drawing Sheets

Figure 1

| id | name | language | country | description |
|---|---|---|---|---|
| 220304 | tennis sweater | EN | US | sweater for playing tennis |
| 220304 | tennis jumper | EN | AU | jumper for playing tennis |
| 220304 | suéter de tenis | ES | MX | suéter para tenis |
| 220304 | tennis sweater | EN | CA | sweater for playing tennis |

Figure 2

| id | name_EN_US | name_EN_AU | name_ES_MX | ... | description_EN_US | ... |
|---|---|---|---|---|---|---|
| 220304 | tennis sweater | tennis jumper | suéter de tenis | ... | sweater for playing tennis | ... |
| 220305 | tennis racket | ... | ... | ... | ... | ... |

Figure 3

| id | name_ID | description_ID | ... |
|---|---|---|---|
| 220304 | 17 | 334 | ... |
| 220305 | 22 | 427 | ... |

| name_ID | audience_ID | size | text | ... |
|---|---|---|---|---|
| 17 | 0 | 14 | tennis sweater | ... |
| 17 | 1 | 13 | tennis jumper | ... |
| 22 | ... | ... | ... | ... |

Figure 4

| audience_ID | audience_order | position | alive |
|---|---|---|---|
| 0 | 0 | 0 | TRUE |
| 0 | 1 | 1 | TRUE |
| 0 | 2 | 2 | TRUE |
| 0 | 3 | 3 | FALSE |
| 4 | 4 | 0 | TRUE |
| 4 | 0 | 1 | TRUE |
| ... | ... | ... | |

Figure 5

| audience_ID | language | country | region | name | ... |
|---|---|---|---|---|---|
| 0 | eng | USA | whole | English US | ... |
| 1 | eng | AUS | whole | English Australia | ... |
| 2 | esp | MEX | whole | Spanish Mexico | ... |
| 3 | eng | USA | California | English Calif | ... |
| 4 | eng | CAN | whole | English CAN | |

MULTI-LAYERED DATA MODEL FOR GENERATING AUDIENCE-SPECIFIC DOCUMENTS

BACKGROUND OF THE INVENTION

1. Field of the Invention

Embodiments of the invention described herein pertain to the field of computer systems and software. More particularly, but not by way of limitation, one or more embodiments of the invention are directed to systems and methods for generating audience-specific documents via a multi-layered data model.

2. Description of the Related Art

In certain circumstances it is desirable to publish different versions of the same basic document. A catalog publisher may, for example, wish to make the same basic catalog available in different languages and/or create different versions of the catalog that take into account the different regional, regulatory, and cultural requirements of the audience for which the catalog is being published.

Although current systems provide the ability to publish a document in different languages, these existing systems lack the ability to easily publish different versions of the same document using a layered subset of data that is applied to the document in accordance with a set of document specific rules. Instead these existing systems make use of a template file to change the language upon which a document is based. One major drawback to the template approach is that it leads to duplicate data and requires users to switch between templates without giving the user the ability to globally view what underlying data is associated with each template. Duplicates arise when data that is common to numerous languages (e.g., product ID numbers or other numbers) is stored in a way that requires duplication for each language with which the data is associated. Some systems spread language and locale specific values across fields in each row instead of utilizing unique rows per language within a database, but this technique still leads to significant redundant data when two languages for example share almost all of the same words, e.g., US and UK versions of English.

Removing support for a given audience requires deleting rows or columns of the database when the database is structured as described above. Adding support for a new audience requires copying large amounts of data, either rows or columns and altering small amounts of data if the audience information is nearly the same or adding large amounts of information when the newly supported audience is a completely different language.

For at least the limitations described above there is a need for a system that implements a multi-layered data model in a way that makes it feasible to eliminate data duplication and maintain data integrity for audience-specific documents.

SUMMARY OF THE INVENTION

One or more embodiments of the invention enable the generation of audience-specific documents through the use of a multi-layered data model that minimizes storage space and enables rapid access to the underlying data incorporated into audience-specific documents the system generates. The word "audience" as it is used herein means a group of people that share a set of common understandings (e.g., language) or constraints (e.g., regulations, cultural nuances, etc. . . . ). The invention described herein makes use of its unique data model to generate documents that are specific to a given audience. Hence, the data the system provides for purposes of generating a specific document is customized to suit the needs of the audience for which the document is intended.

The data contained within each customized document may vary depending upon a set of rules that define the language, regional, geographic, regulatory or cultural requirements specific to the audience at which the document is targeted. For instance, the system may generate one document so that it contains data targeted at a group of English speaking individuals who live in a specific region of the United States. The system may then generate a second document using data targeted at Spanish speaking people who live in the same or a different region of the United States. The system may also generate yet another version of the same document targeted at people who speak French and live in France. If different rules or regulations are applicable to a particular target audience (e.g., those who live in France rather than the United States) the system utilizes data in compliance with the regulatory requirements or culture preferences of the target audience. The system may also generate various other types of audience-specific documents and does so using the data model described herein.

One or more embodiments of the invention make use of a layered approach to obtaining the data needed to generate a particular document. For instance, the user may associate each document that is to be generated with a current, primary and secondary layer of data. The current layer of data defines what data elements makeup the preferred language, region or other characteristics that affect the contents of the document. The primary layer of data defines the next best set of data to use when the data for the current layer is unavailable. The secondary layer of data identifies what data to use when data from the first two choices is unavailable in the underlying repository.

Using a data model that provides the system with the ability to layer data in this manner provides users with a flexible mechanism for specifying a given traversal order. When generating a document the system checks the traversal order to determine what data is to be associated with what layer (e.g., current, primary, and secondary). If, for instance, the current layer is set to use data written in the English language and no such data is available, the system may insert data that uses the second choice (e.g., UK English, Spanish, etc. . . . ). This same notion of layering is also applicable to aspects of a document other than language (e.g., geographic, regional, regulatory and/or cultural requirements). Hence the system may select a second choice as that choice is defined by the order of traversal whenever the preferred data is not available.

To eliminate data redundancy the data model that enables the layering of data described herein may be configured to utilize the same data for different layers when the value is the same for each layer. When such data is changed it impacts information associated with multiple layers and thereby updates multiple layers at a time.

The data model that enables one or more aspects of the invention makes use of an audience identifier that defines what target audience the document is to be generated for. The audience identifier may be supplied to the system manually or automatically from the user or via a computer associated with a user. Once the audience identifier is obtained, the system is able to generate an audience-specific document by using an ordering element associated with the audience identifier. This ordering element, referred to as an audience order identifier, defines what data to utilize when data from the initial target audience of choice is unavailable.

The order specifies the actual data to utilize when accessing a repository that contains values for a plurality of target audiences. In one embodiment of the invention the value specific to a given audience is obtained from the data table using the first audience order identifier and the reference identifier of the value as obtained from a main data table. If the value exists, it is returned. If the value does not exist for a given audience order identifier and reference, then the audience order identifier is accessed in order to find the next audience that has an appropriate value. The next position found in the audience order table for a given audience identifier is utilized in order to access the data table. The processing repeats until a value is found. The use of the term tables and structures is synonymous herein unless specified otherwise.

To provide support for an additional audience there is no need to add multiple rows for each entry in the main data table or add fields for each new audience. The data table is merely augmented with values that are unique to the new audience. Hence it is not necessary to duplicate data that already exists for a given audience. The main data table does not need to be altered in order to add support for a new audience. An audience that uses all of the data of another audience may specify an audience order that uses another audience as the first audience to obtain data from. In other words, the data that is obtained may not be from the selected audience, but may be from a different audience that has appropriate values. This means that the audience uses another audience first to obtain data without checking for the existence of values corresponding to its own audience identifier. Such functionality is particularly useful in cases where minimal data is available for the audience of choice.

When a data entry is added to the system that would be different with respect to the first position audience, then the first audience order identifier may be set to the actual audience identifier for the audience and the single entry in the data table may be added so that the entry is obtained. Other entries in the data table would be obtained in this example by observing that the values do not exist for the specific audience identifier and that the second audience order identifier is utilized to obtain these entries. In this manner, only one entry in a data table that is not the main data table is added while the audience order table is updated to allow for the traversal to another audience when entries are not found for a given audience. The number of data entries in the data table for two audiences that are traversed in general differs (although there may be an equal number of entries that cover between zero and all of the data entries corresponding to references in the main data table).

An audience may be enabled or disabled and an entity such as a company configured to use the system may pay to allow access for multiple audiences. Alternatively individual users may pay for access to a particular audience depending upon what embodiment of the invention is implemented.

DETAILED DESCRIPTION OF THE INVENTION

One or more embodiments of invention directed to a multi-layered data model for generating audience-specific documents will now be described. The invention is used in the context of generating a document such as a catalog or web page for publication across regions and cultures comprising multiple languages. It allows users to rapidly generate multi-language, multi-culture and multi-region documents since fields flagged as such may utilize existing buckets that comprise pre-filled multi-language, multi-culture and multi-region values without requiring the user to specify every multi-value when creating a record.

The multi-layered data model improves upon the prior art by providing users with a mechanism for generating documents in accordance with a set of rules. These rules allow for the application of various language, regional, regulatory, and cultural requirements that exist for each document. Systems configured in accordance with embodiments of the invention may, for instance, be utilized to generate documents for one region that take into account the specific regulatory requirements of that region while maintaining the ability to properly generate the same document set for a different region having different regulatory or other requirements. For example, certain countries have laws that ban particular items or words. Embodiments of the invention are capable of generating a set of documents that implement a set of publication constraints defined by the user. Hence the same basic document may be published in numerous forms where each form is customized to suit the needs of a particular target audience.

In addition to providing a mechanism generating documents in accordance with a set of rules, one or more embodiments of the invention implement functions that enable the user to define an ordering priority for data to be included into a document that is to be published. This designation of an ordering priority is typically defined by one or more of the system users and can be changed as needed. For instance, the user may associate each document that is to be generated with a current, primary and secondary layer of data. The current layer of data defines what data elements makeup the preferred language, region or other characteristics that affect the contents of the document. If data stored in the repository from which the document data is obtained is designated as current data, the system will utilize that data. If no data is available at the current layer the system will then seek data from a primary layer. The primary layer of data defines the next best set of data to use when the data at the current layer is unavailable. As such the system may utilize data from the primary layer only when data from the current layer is unavailable. If, for instance, the current layer is set to use data written in the English language and no such data is available, the system may insert data associated with the primary layer (e.g., UK English, Spanish, etc. . . . ). This same notion of layering is also applicable to aspects of a document other than language (e.g., geographic, regional, regulatory and/or cultural requirements).

In addition to the current and primary layers described above, systems may also make use of data associated with a secondary layer. The secondary layer of data identifies what data to use when data from the first two choices is unavailable in the underlying repository. However with secondary (or even sometimes primary data) the system will prompt the user so that the user can determine if the alternative data choice is appropriate in the context within which it is to be placed in the document. In cases where the data choice is not appropriate, users may access the repository and input current data or primary data for the system to utilize.

The data model upon which the system is based is structured to make it feasible to implement rules and define what sequence of layers to utilize when generating an audience-specific document. This data model is also configured to minimize storage space and provide rapid access to the data used to generate an audience-specific document. The system may optionally make use of bit vectors and configurable views to further provide mechanisms for generating audience-specific documents.

The data model configured in accordance with one or more embodiments of the invention may utilize data from another audience layer when data for a given entry is found to not exist, but the value is potentially the same for both audiences. The audiences (e.g., a defined choice of language, country, regional, cultural and/or regulatory preferences) may utilize an entry from a different audience if the value is the same for both audiences. Having the ability to traverse audiences to obtain certain data entries (e.g., numerical data) eliminates redundant data and minimizes storage requirements. Updating information for multiple audiences occurs automatically without the need to update all entries for a given chain of audiences that utilize a particular entry.

Figure 1:
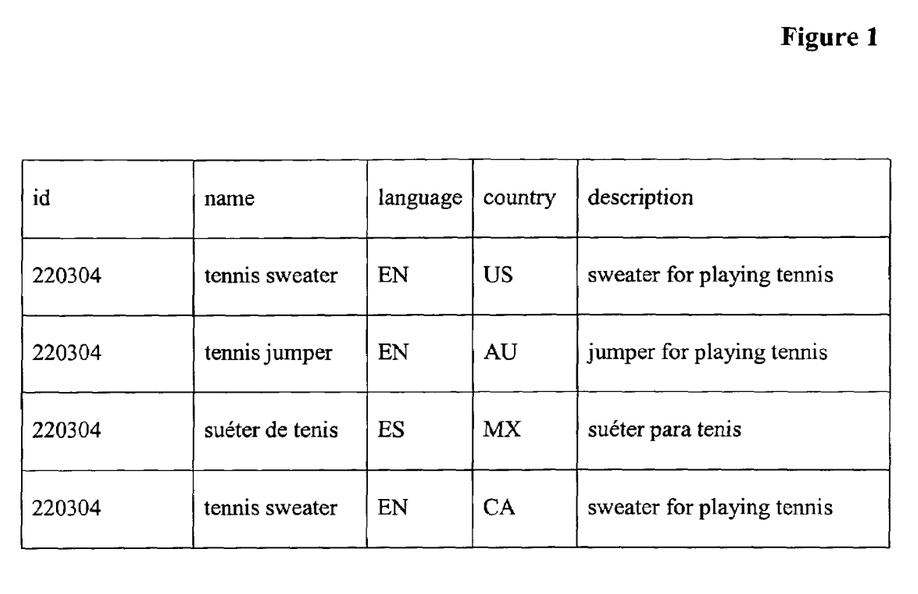
FIG. 1 illustrates a table with rows corresponding to each audience.

FIG. 1 illustrates a table with data where each row corresponds to a particular audience. For example, each product comprises an "id" that is an identifier for the product as shown in the leftmost column of the table. The name of the product localized for the target audience is shown in the second column with field name "name". The language that the product information is to be targeted is entered in the next column and may comprise an integer identifier corresponding to a character based language code. The country code is shown in the next column along with a description for the product in the target audience language for the specified country. For instances that utilize a region within a country the system may utilize another column having a region code or integer identifier. The problem with the table is that for all of the products in the table there may only be minimal differences between some of the audiences. For example, although "sweater" may referred to in Australia as "jumper", most of the other product entries in a catalog may be identical for the two audiences. This means that for N audiences there are N*M product entries where M is the number of products. In addition, some audiences may be indistinguishable for a given document from another audience. For example the bottommost row in the table corresponds to Canada and is an identical copy of the product targeted at the US audience.

Figure 2:
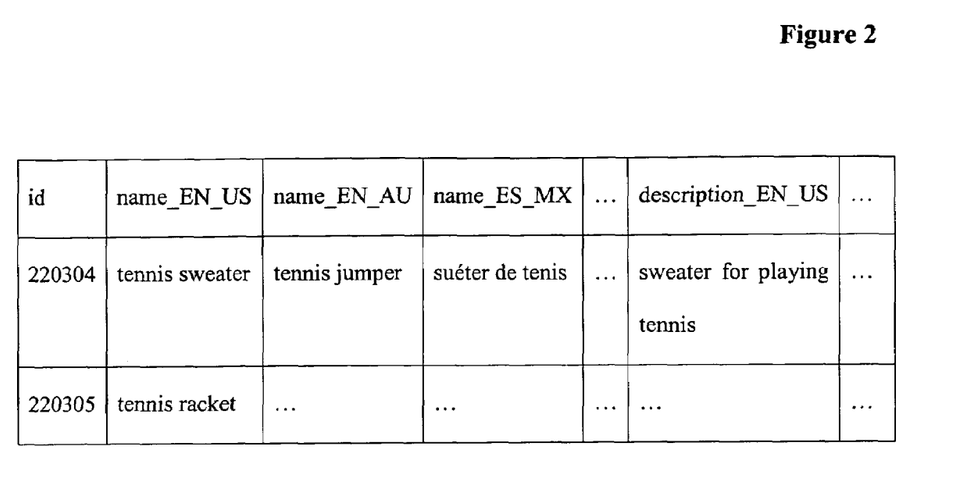
FIG. 2 illustrates a table comprising fields specific to an audience.

FIG. 2 illustrates a table that contains fields specific to a particular audience. This method of generating a document for an audience is orthogonal to the method utilized with regards to the table structure depicted in FIG. 1. An additional column per audience is utilized instead of an additional row per audience. When additional audiences are added or subdivided, additional field are entered for the newly supported audience. Storing additional field data in this manner is inefficient since the elements that have changed are updated in the new column with the majority of the newly added column comprising copies of the first column.

Figure 3:
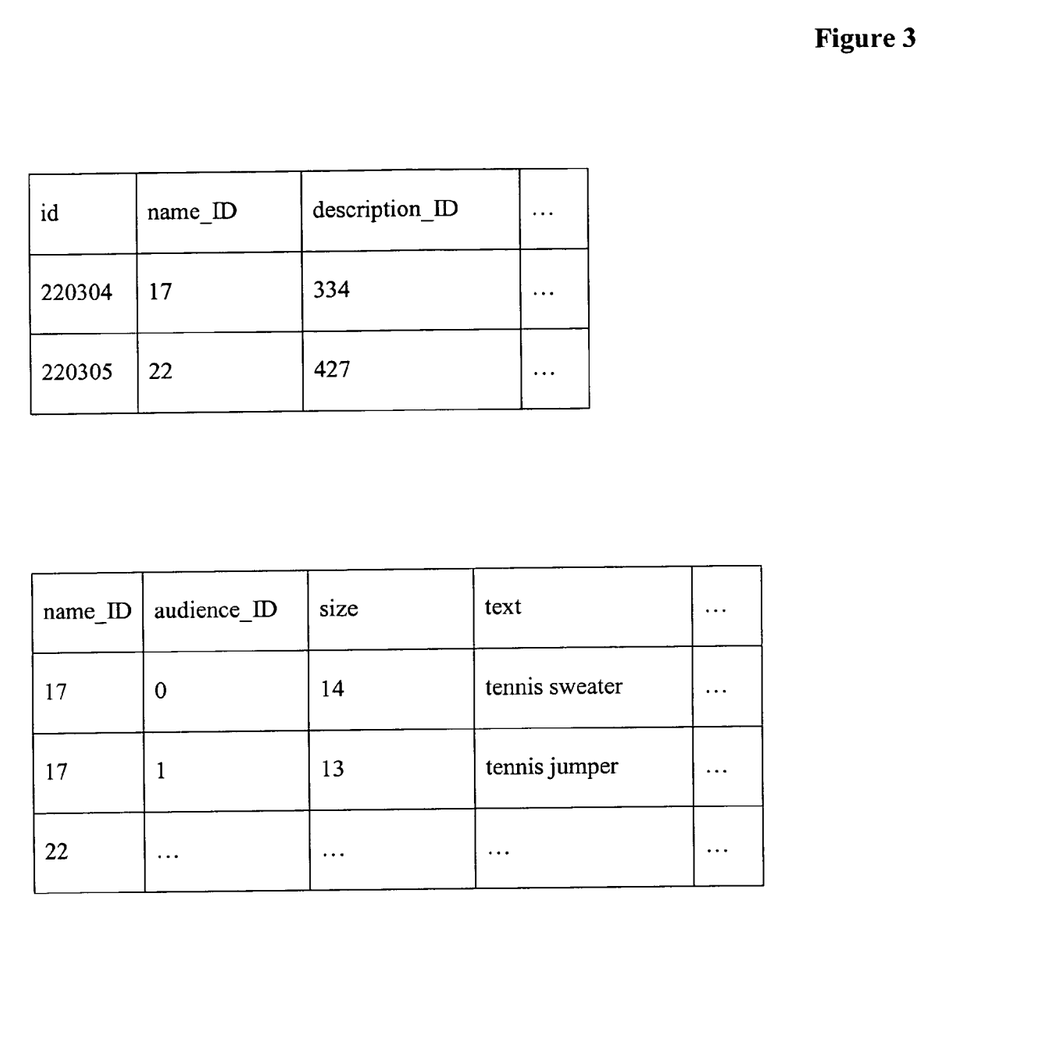
FIG. 3 illustrates a table comprising references to a second table comprising fields specific to an audience.

FIG. 3 illustrates a table that contains references to a second table of audience-specific entries. When systems utilize the structure depicted in FIG. 3 storage becomes significantly more efficient. By utilizing an integer identifier that points into the second table shown in FIG. 3, large text strings are stored only once regardless of the number of audiences that utilized the string. For example, moving the text string product names out of the main product table shrinks the column proportional to M, i.e., the number of products. By eliminating the use of columns specific to an audience, the savings of P columns where P is the number of fields in each row targeted at an audience, for example "name" and "description" as shown in FIG. 2. By storing the audience identifier in the second table and not requiring multiple rows in the first table for each audience there is a reduction by N, i.e., the number of audiences, in the amount of storage required in the topmost table. Further storage savings are achieved by utilizing a layered hierarchy for searching for entries not specified for an audience to take advantage of similarities between audiences. As shown in the second table of FIG. 3, only entries having different content are entered into the table. Also shown is an optional column containing the size of the text in an associated field. As shown in the topmost table in FIG. 3, names and descriptions may comprise identifiers that utilize the second table.

Figure 4:
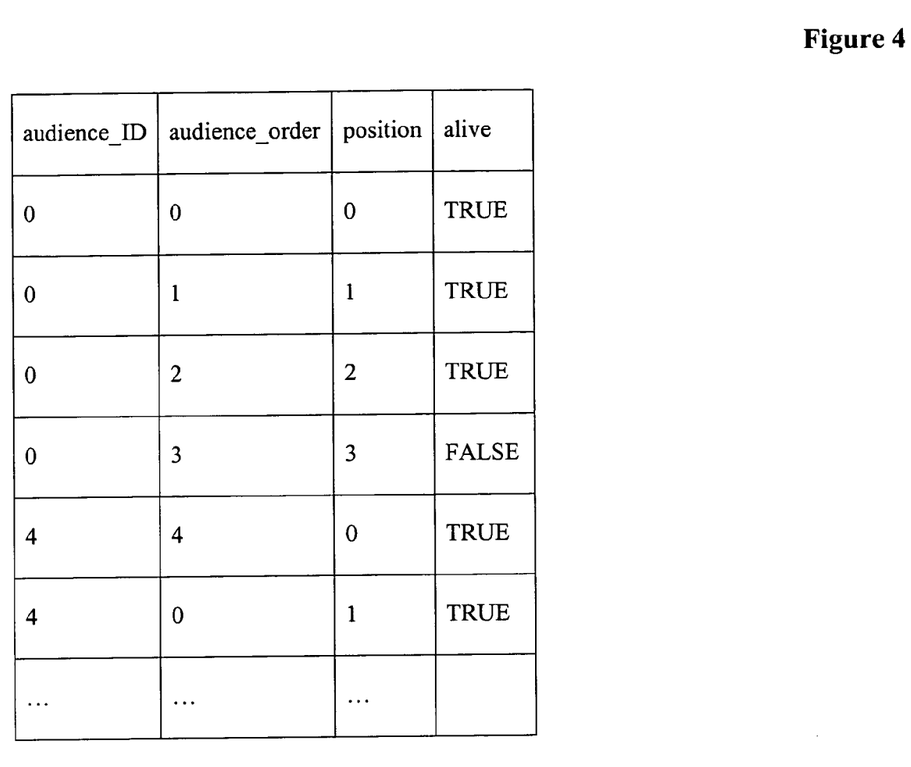
FIG. 4 illustrates a table comprising an audience hierarchy for each audience.

FIG. 4 illustrates a table that contains an audience hierarchy for each audience. In one or more embodiments of the invention this table provides a mechanism for finding the nearest match for a given entry when an item is not specified for an audience. For example, given an audience comprising Canada, English and the whole region of Canada, (audience ID=4), since there is no entry for a Canadian audience in the bottommost table of FIG. 3, the table of FIG. 4 is referenced in order to determine what audience to utilize for the requested item. For example if the entries of the products all contain identical names for an added audience then that audience identifier in position "0" may simply make use of a different audience identifier. In other words for audience ID=4, and position=0, an audience identifier of "0" would allow for the lookup of the text for a field in the bottommost table of FIG. 3 with audience ID of "0", i.e., the first row as shown. If the audience order for position=0 is set to the same audience ID, then the audience ID=4 is checked first in the bottommost table in FIG. 3 followed by the position=1 audience, which in this case yield "0" corresponding to the English US whole region audience. This audience ID is then used in looking up the need information from the bottommost table in FIG. 3 yielding "tennis sweater" for the Canadian audience. If a given audience has been eliminated from the path utilized in looking up information, then the "alive" flag may be set to a value indicating the audience has been disabled either temporarily or for a given session for example. Alternatively, this information may be extracted from the table and determined through appropriate business logic. In one or more embodiments of the invention, the "alive" flag may be utilized in the manner set forth in the figure described below.

Figure 5:
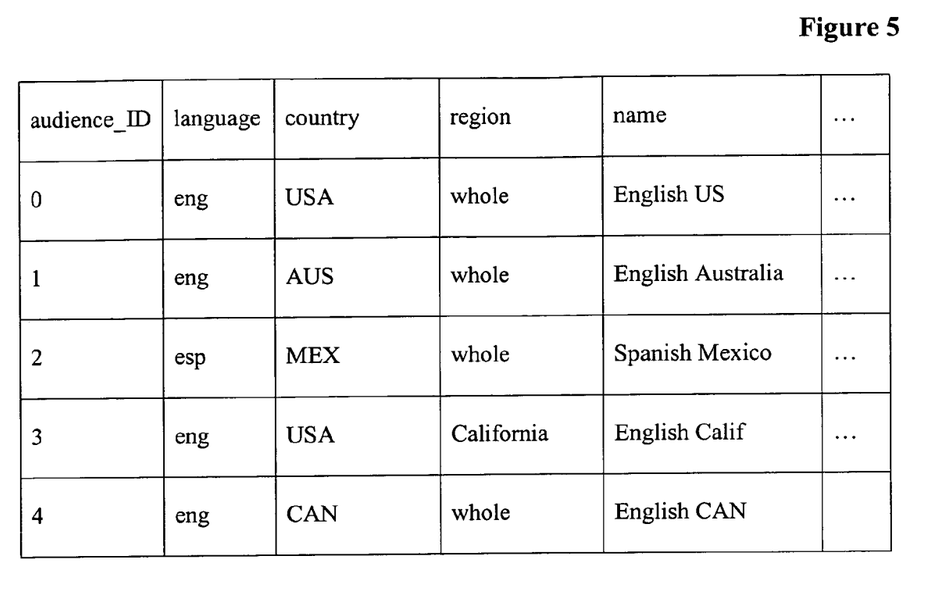
FIG. 5 illustrates a table comprising audience definitions.

FIG. 5 illustrates a table that contains a set of audience definitions. When presenting a user with the opportunity to select the desired audience for which to target a document, the information in the table depicted in FIG. 5 may be utilized. The table in FIG. 5 may also be utilized in to disable an audience or augment an audience with a sub-region for example. If the alive flag is set to indicate that the audience is disabled, then the audience is skipped if the audience is referenced in FIG. 4. Any other method of disabling an audience either temporarily or permanently is in keeping with the spirit of the invention. As shown in FIG. 5 a region is identified that is a subset of the United States, namely California. For audience identifier=3, values that are obtained from the bottommost table in FIG. 3 may be region specific in that a document generated for a person in that region may contain elements that are substituted based on regulatory or other region specific requirements. For example a vehicle being sold for California may make use of a text description containing information related to emissions standards that are specific to the region. As all of the other entries related to the vehicle are standard regardless of region, the only entry that the California region may utilize that is different relates to the emissions parameters of the vehicle and therefore to generate two sets of documents, one for the entire United States region minus California, and one for California only one small piece of information is added to the system, specifically the emissions portion of the entire vehicle description.

Figure 6:
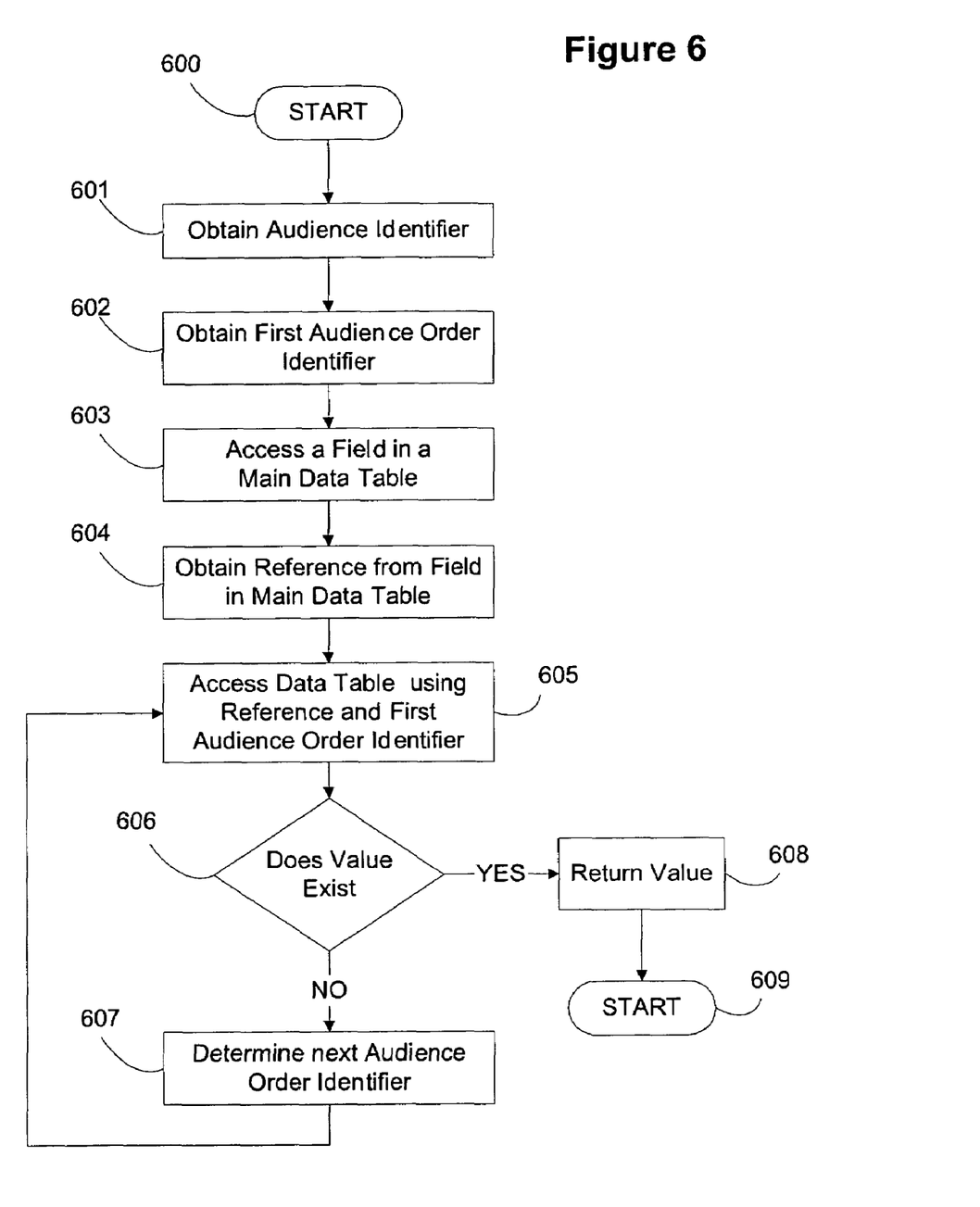
FIG. 6 illustrates a flow chart describing the steps for accessing an audience-specific value based on an audience identifier and a field reference.

FIG. 6 illustrates a flow chart describing the steps for accessing an audience-specific value based on an audience identifier and a field reference. Operation of one or more embodiments of the invention occurs after starting at 600. An audience identifier is obtained by the system at 601. The audience identifier may be entered manually or automatically from the user or computer associated with a user. Once the audience identifier is obtained, the system may generate an audience-specific document. In at least one instance, the audience-specific document are generated by obtaining an audience order identifier for an initial position from an audience order table or structure at 602. The audience order identifier specifies the actual audience to utilize when accessing a data table that contains values for at least one audience. The main data table is accessed at a particular field without reference to the audience at 603 to obtain a reference identifier that is common to all audiences for this piece of data at 604. The value specific to a given audience is obtained from the data table using the first audience order identifier and the reference identifier of the value at 605. If the value exists as determined at 606, it is returned at 608 and processing ends at 609. If the value does not exist for a given audience order identifier and reference, then the audience order table is accessed in order to find the next audience identifier to utilize in accessing the data table that may comprise the value at 607. The next position found in the audience order table for a given audience identifier is utilized in order to access the data table. The processing repeats at 605 until a value is found. Although the terminology of this processing utilizes database nomenclature data structures in memory may also be utilized as one skilled in the art will recognize.

To provide support for another audience there is no need to add multiple rows for each entry in the main data table or add fields for each new audience. The data table (as opposed to the main data table) is merely augmented with only those values that are unique to the new audience with respect to audience related data for a given audience that already exists in the data table. For example, the main data table, i.e., the upper table shown in FIG. 3 is not altered in any way when adding support for a new audience. Instead, the lowermost table in FIG. 3 is augmented with audience-specific values that differ from a desired audience as is traversed via the table shown in FIG. 4. The main data table does not require altering in any way in order to add support for a new audience. An audience that uses all of the data of another audience may specify an audience order that uses another audience as the first audience to obtain data from. In other words, the first audience used in order to obtain data may not be the particular audience itself. This means that the audience uses another audience first to obtain data without checking for the existence of values corresponding to its own audience identifier.

When a data entry is added to the system that would be different with respect to the first position audience, then the first audience order identifier is set to the actual audience identifier for the audience and the single entry in the data table may be added so that the entry is obtained with respect to the actual audience identifier instead of traversing to another audience. All other entries in the data table would be obtained in this example by observing that the values do not exist for the specific audience identifier and that the second audience order identifier is utilized to obtain these entries. In this manner, only one entry in a data table that is not the main data table is added while the audience order table is updated to allow for the traversal to another audience when entries are not found for a given audience. The number of data entries in the data table for two audiences that are traversed in general differs although there may be an equal number of entries that cover between zero and all of the data entries corresponding to references in the main data table.

Figure 7:
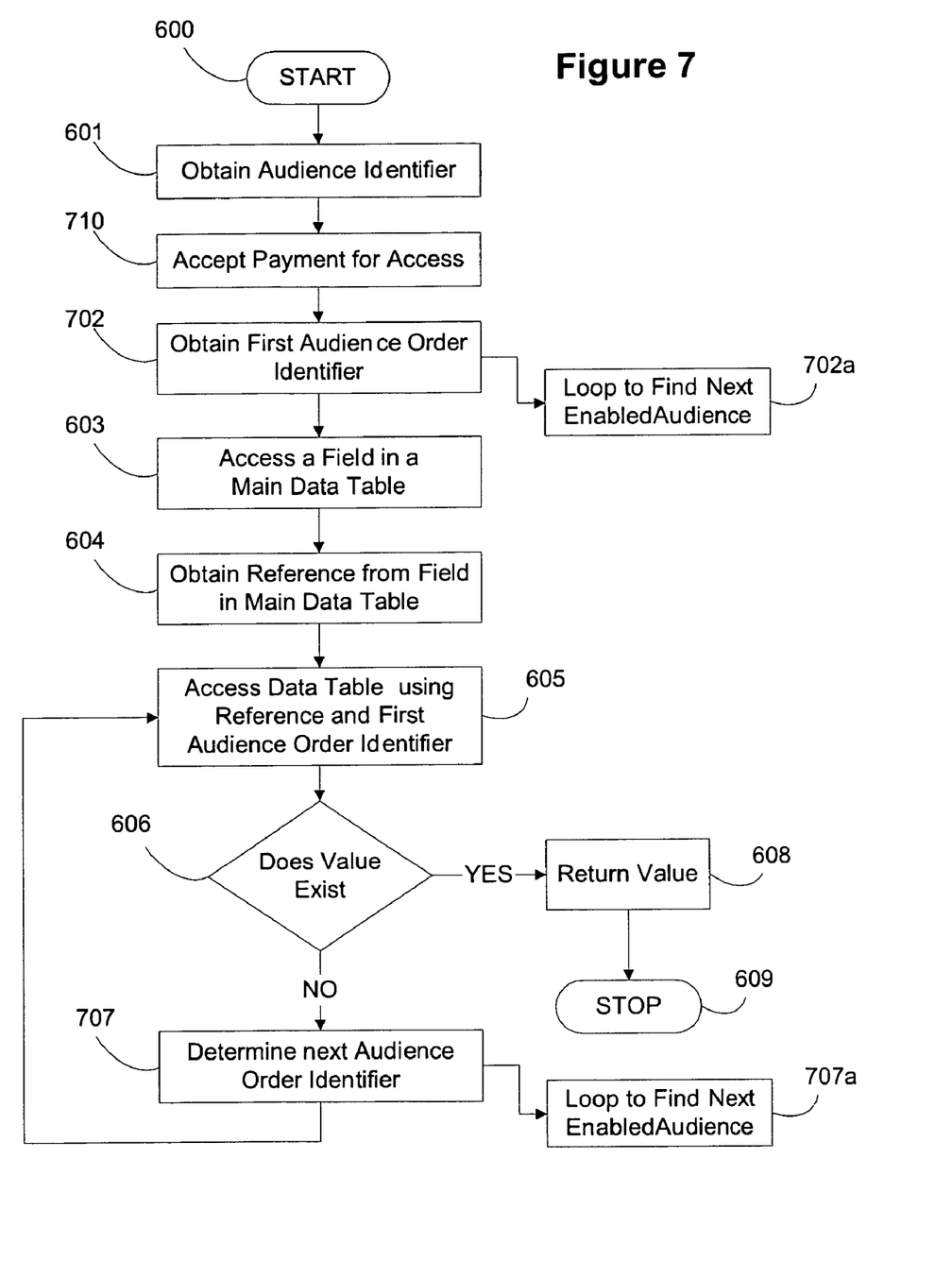
FIG. 7 illustrates a flow chart describing the steps for accessing an audience-specific value based on an audience identifier and a field reference after optionally accepting payment for access to an audience-specific access and checking for enabled audiences.

FIG. 7 shows another embodiment of the processing associated with one or more embodiments of the invention. Processing occurs as in FIG. 6 except where steps in the 700 series exist. For example, optional step 710 exists to obtain payment information from a company or individual user in order to access specific audience related information. Obtaining a first audience order identifier at 702 utilizes a loop to find the next enabled audience at 702a. Audiences may be enabled or disabled independent of whether a company or individual user has paid for access to audience-specific data. In addition, determining the next audience order identifier at 707 utilizes a loop to find the next enabled audience at 707a. An audience may be enabled or disabled and an entity such as a company configured to use the system may pay to allow access for multiple audiences. Alternatively individual users may pay for access to a particular audience depending on the embodiment.

Users of the system may access an audience-specific document by manually providing the language, country and region within a country that the document should be targeted for. Alternatively, browser settings or operating system environment variables for example may be queried by the system in order to automatically generate an audience-specific document. Any method of determining the target audience may be utilized with one or more embodiments of the invention.

U.S. patent application Ser. No. 09/577,268 entitled "Timeshared Electronic Catalog System And Method" filed May 23, 2000, U.S. Pat. No. 6,754,666 entitled "Efficient Storage And Access In A Database Management System" filed Aug. 21, 2000, U.S. patent application Ser. No. 09/643,316 entitled "Data Indexing Using Bit Vectors" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 10/022,056 entitled "Method And Apparatus For Transforming Data" filed Dec. 12, 2001, U.S. patent application Ser. No. 09/960,541 entitled "Method And Apparatus For Dynamically Formatting And Displaying Tabular Data In Real Time" filed Sep. 20, 2001, U.S. patent application Ser. No. 10/172,572 entitled "Method And Apparatus For Generating And Utilizing Qualifiers And Qualified Taxonomy Tables" filed Jun. 13, 2002, U.S. patent application Ser. No. 10/990,293, entitled "Accelerated System And Methods For Synchronizing, Managing, And Publishing Business Information" filed Nov. 15, 2004, U.S. patent application Ser. No. 10/990,292 entitled "System And Method For Dynamically Constructing Synchronized Business Information User Interfaces" filed Nov. 15, 2004, U.S. patent application Ser. No. 10/990,294 entitled "System And Method For Dynamically Modifying Synchronized Business Information Server Interfaces" filed Nov. 15, 2004, are all hereby incorporated herein by reference.

While the invention herein disclosed has been described by means of specific embodiments and applications thereof, numerous modifications and variations could be made thereto by those skilled in the art without departing from the scope of the invention set forth in the claims. In the description above numerous specific details are set forth in order to provide a more thorough understanding of embodiments of the invention. It will be apparent, however, to an artisan of ordinary skill that the present invention may be practiced without incorporating all aspects of the specific details described herein. In other instances, specific details well known to those of ordinary skill in the art have not been described in detail so as not to obscure the invention. Readers should note that although examples of the invention are set forth herein, the claims, and the full scope of any equivalents, are what define the metes and bounds of the invention.

What is claimed is:

1. In a computer system, a method for utilizing a multi-layered data model comprising database tables that minimize data redundancy to identify audience specific data to use in generating an audience specific document comprising:
constructing a first audience order database table that is updated to allow for a traversal to another audience when entries are not found for a given audience;
constructing a second main database table for said document that does not need to be altered in order to add support for a new audience;
constructing a third data attribute database table that is augmented with values that are unique to said new audience;
accepting a subset of data for said new audience with respect to said given audience into said third data attribute database table wherein said subset of data is unique to said new audience with respect to said given audience, wherein new audience data not contained in said subset of data is inherited from at least one other parent audience, and wherein said new audience and said given audience differ in one or more of language, country, region, regulatory or cultural designations;
determining an audience for an audience specific document;
determining an audience identifier for said audience;
obtaining a first audience order identifier from said first audience order database table comprising audience order using said audience identifier;
obtaining an audience-independent reference identifier from said second main database table as required by said audience specific document;
searching said third data attribute database table for a matching entry comprising both said audience order identifier and said audience-independent reference identifier, and where said searching fails,
searching said first audience order database table and retrieving a next audience order identifier based on a hierarchy of audience order identifiers for said audience identifier, substituting said first audience order identifier with a next audience order identifier, and repeating said searching until said searching successfully identifies said matching entry in said third data attribute database table;
identifying audience specific data in said matching entry;
generating said audience specific document using said audience specific; and, wherein said first audience order database table, said second main database table, and said third data attribute database table are configured to utilize the same data for multiple audiences when the data is the same for each audience.

2. The method of claim 1 further comprising:
adding a second audience comprising adding second audience data only to said third data attribute database table.

3. The method of claim 1 further comprising:
accessing said first audience order database table to determine if a first audience is enabled.

4. The method of claim 1 further comprising:
accepting payment for access to said audience specific data.

5. The method of claim 1 further comprising:
setting said first audience order identifier equal to a second audience identifier in said first audience order database table.

6. The method of claim 1 further comprising:
identifying said audience specific data for said audience specific document where said audience specific document is a web page.

7. The method of claim 1 further comprising:
identifying said audience specific data for said audience specific document where said audience specific document is a catalog.

8. The method of claim 1 further comprising:
determining said audience for said audience specific document further comprising obtaining information regarding said audience from a user interface.

9. The method of claim 1 further comprising:
determining said audience for said audience specific document further comprising obtaining information from an environment variable.

10. The method of claim 1 further comprising:
determining said audience for said audience specific document further comprising obtaining information from a browser session variable.

11. In a computer system, a method for utilizing a multi-layered data model comprising database tables that minimize data redundancy to identify audience specific data to use in generating an audience specific document comprising:
constructing a first audience order database table that is updated to allow for a traversal to another audience when entries are not found for a given audience;
constructing a second main database table for said document that does not need to be altered in order to add support for a new audience;
constructing a third data attribute database table that is augmented with values that are unique to said new audience;
wherein said first audience order database table, said second main database table, and said third data attribute database table are configured to utilize the same data for multiple audiences when the data is the same for each audience;
accepting a subset of data for said new audience with respect to said given audience into said third data attribute database table wherein said subset of data is unique to said new audience with respect to said given audience, wherein new audience data not contained in said subset of data is inherited from at least one other parent audience, and wherein said new audience and said given audience differ in one or more of language, country, region, regulatory or cultural designations;
determining an audience for an audience specific document;

determining a first audience identifier for said audience;

determining if said first audience identifier is enabled, if said first audience identifier is enabled, setting audience identifier to a value of said first audience identifier;

wherein if said first audience identifier is not enabled, determining a next enabled audience identifier, and setting audience identifier to a value of said next enabled audience identifier;

obtaining a first audience order identifier from said first audience order database table comprising audience order using said audience identifier;

obtaining an audience-independent reference identifier from said second main database table as required by said audience specific document;

searching said third data attribute database table for a matching entry comprising both said audience order identifier and said audience-independent reference identifier, and where said searching fails, searching said first audience order database table and retrieving a next audience order identifier based on a hierarchy of audience order identifiers for said audience identifier, substituting said first audience order identifier with a next audience order identifier, and repeating said searching until said searching successfully identifies said matching entry in said third data attribute database table;

identifying audience specific data in said matching entry; and, generating said audience specific document using said audience specific data.

12. The method of claim 11 further comprising:
identifying said audience specific data for said audience specific document where said audience specific document is a web page.

13. The method of claim 11 further comprising:
identifying said audience specific data for said audience specific document where said audience specific document is a catalog.

14. The method of claim 11 further comprising:
determining said audience for said audience specific document further comprising obtaining information regarding said audience from a user interface.

15. The method of claim 11 further comprising:
determining said audience for said audience specific document further comprising obtaining information from an environment variable.

16. The method of claim 11 further comprising:
determining said audience for said audience specific document further comprising obtaining information from a browser session variable.

17. In a computer system, a method for utilizing a multi-layered data model comprising database tables that minimize data redundancy to identify audience specific data to use in generating an audience specific document, comprising:

constructing a first audience order database table that is updated to allow for a traversal to another audience when entries are not found for a given audience;

constructing a second main database table for said document that does not need to be altered in order to add support for a new audience;

constructing a third data attribute database table that is augmented with values that are unique to said new audience;

wherein said first audience order database table, said second main database table, and said third data attribute database table are configured to utilize the same audience specific data structure in memory when the data is the same for each audience;

determining an audience for an audience specific document;

determining an audience identifier for said audience;

obtaining a first audience order identifier from said first audience order database table comprising audience order using said audience identifier;

obtaining an audience-independent reference identifier from said second main database table as required by said audience specific document;

searching said third data attribute database table for a matching entry comprising both said audience order identifier and said audience-independent reference identifier, identifying audience specific data in said matching entry;

and generating said audience specific document using said audience specific data.

18. The method of claim 17, in which utilizing the same audience specific data structure in memory is done by using at least one integer identifier to point to text strings that are stored only once regardless of the number of audiences that use said text strings.

19. The method of claim 17, in which at least the first audience order database table is configured in an audience hierarchy for each audience;
wherein for each audience a list of nearest match audiences is provided that is ranked in order;
and if a current layer of data for said audience is not available, then at least a primary layer of data is referenced in said order of said ranking to determine what said ranked in order nearest match audience to use.

20. The method of claim 19, wherein at least one audience in said list of nearest match audiences may be enabled or disabled, and if said at least one audience in said list of nearest match audiences is disabled, said at least one audience is not referenced in order to determine what ranked in order nearest match audience to use.

* * * * *